(12) United States Patent
Barnard et al.

(10) Patent No.: US 9,366,514 B1
(45) Date of Patent: Jun. 14, 2016

(54) SYSTEM, METHOD AND COMPUTER PROGRAM PRODUCT FOR PROVIDING FOR A COURSE VECTOR CHANGE OF A MULTIPLE PROPULSION ROCKET PROPELLED GRENADE

(71) Applicant: LOCKHEED MARTIN CORPORATION, Bethesda, MD (US)

(72) Inventors: Harry R. Barnard, Bynum, TX (US); Toby D. Thomas, Southlake, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 14/631,108

(22) Filed: Feb. 25, 2015

Related U.S. Application Data

(60) Provisional application No. 61/944,397, filed on Feb. 25, 2014.

(51) Int. Cl.
| | |
|---|---|
| *F41G 7/22* | (2006.01) |
| *F42B 15/01* | (2006.01) |
| *F41G 3/14* | (2006.01) |
| *G05D 1/12* | (2006.01) |
| *G05D 1/08* | (2006.01) |
| *F41G 7/20* | (2006.01) |
| *F41G 7/00* | (2006.01) |
| *F42B 15/00* | (2006.01) |

(52) U.S. Cl.
CPC ............... *F42B 15/01* (2013.01); *F41G 3/145* (2013.01); *F41G 7/20* (2013.01); *F41G 7/22* (2013.01); *G05D 1/0808* (2013.01); *G05D 1/12* (2013.01)

(58) Field of Classification Search
CPC ...... G05D 1/08; G05D 1/0808; G05D 1/0883; G05D 1/12; F41G 3/14; F41G 3/145; F41G 7/20; F41G 7/22; F41G 7/2206; F41G 7/2246; F41G 7/226; F42B 15/01
USPC ................................................ 244/3.1–3.3
See application file for complete search history.

(56) References Cited

U.S. PATENT DOCUMENTS

| | | | | |
|---|---|---|---|---|
| 4,561,611 | A * | 12/1985 | Sinclair et al. | 244/3.16 |
| 4,568,039 | A * | 2/1986 | Smith et al. | 244/3.15 |
| 4,728,057 | A * | 3/1988 | Dunne | 244/3.16 |
| 5,600,946 | A | 2/1997 | Dombrowski et al. | |
| 5,788,180 | A * | 8/1998 | Sallee et al. | 244/3.21 |
| 6,138,944 | A | 10/2000 | McCowan et al. | |
| 6,573,486 | B1 * | 6/2003 | Ratkovic et al. | 244/3.2 |
| 6,610,971 | B1 * | 8/2003 | Crabtree | 244/3.1 |

(Continued)

*Primary Examiner* — Bernarr Gregory
(74) *Attorney, Agent, or Firm* — Terry M. Sanks, Esq.; Beusse Wolter Sanks & Maire, PLLC

(57) ABSTRACT

Embodiments relate to a projectile system, method and computer program product for controlling the flight of a projectile to make a course change by approximately 90°, greater than 90° or up to 90°. The projectile system comprises a gun-fired projectile having a body, at least one tail fin, a motor firing during a first flight phase and during a second flight phase and at least one controllable canard. The projectile system includes one or more processors configured to determine a turn maneuver profile to a target during the first flight phase, produce control signals to destabilize the body, create a pitch attitude change for the turn maneuver profile and effectuate a turn of the projectile in a direction corresponding to the turn maneuver profile during the first flight phase. The processors control the motor to start the second flight phase to the target after the turn.

20 Claims, 13 Drawing Sheets

(56) References Cited

U.S. PATENT DOCUMENTS

| | | | |
|---|---|---|---|
| 6,779,752 B1 * | 8/2004 | Ratkovic | 244/3.15 |
| 6,883,747 B2 * | 4/2005 | Ratkovic et al. | 244/3.15 |
| 7,012,233 B2 | 3/2006 | Brown et al. | |
| 7,533,849 B2 | 5/2009 | Zemany et al. | |
| 7,631,833 B1 | 12/2009 | Ghaleb et al. | |
| 7,947,937 B1 * | 5/2011 | Langner | 244/3.16 |
| 7,977,613 B2 * | 7/2011 | Rastegar et al. | 244/3.1 |
| 8,076,621 B2 * | 12/2011 | Rastegar et al. | 244/3.1 |
| 8,093,539 B2 * | 1/2012 | Rastegar | 244/3.19 |
| 8,115,149 B1 * | 2/2012 | Manole et al. | 244/3.14 |
| 8,124,921 B2 * | 2/2012 | Geswender et al. | 244/3.1 |
| 8,258,999 B2 * | 9/2012 | Rastegar et al. | 244/3.1 |
| 8,319,164 B2 | 11/2012 | Martinez | |
| 8,450,668 B2 * | 5/2013 | Maynard et al. | 244/3.16 |
| 8,598,501 B2 * | 12/2013 | Meyer et al. | 244/3.19 |
| 8,637,798 B2 * | 1/2014 | Rastegar | 244/3.1 |
| 8,664,575 B2 * | 3/2014 | Bril et al. | 244/3.15 |
| 2010/0314489 A1 | 12/2010 | Buckland et al. | |

\* cited by examiner

600

602
Propelling a projectile from a launcher with a launch propellant to initiate flight of the projectile

604
Unfolding a fin located at a rear of the projectile to stabilize the projectile and a canard located forward of the fin on the projectile during flight of the projectile

606
Igniting a main propellant charge to provide propulsion of the projectile towards an intended target

608
Once the projectile reaches a point where up to about a 90 degree turn is desired, rotating the canard to slow the projectile and to provide for a pitch rotation of the projectile to make the up to about 90 degree turn

610
Igniting the second pulse propellant charge once the up to about the 90 degree turn is completed to accelerate the projectile to a desired flight velocity at a new vectored direction

FIG. 6

SYSTEM, METHOD AND COMPUTER PROGRAM PRODUCT FOR PROVIDING FOR A COURSE VECTOR CHANGE OF A MULTIPLE PROPULSION ROCKET PROPELLED GRENADE

CROSS-REFERENCE TO RELATED APPLICATIONS

This application claims priority benefit to U.S. Provisional Patent Application No. 61/944,397, entitled "SYSTEM AND METHOD FOR PROVIDING FOR A MID-COURSE VECTOR CHANGE OF A TRIPLE PROPULSION ROCKET PROPELLED GRENADE" filed Feb. 25, 2014, incorporated herein by reference as if set forth in full below.

BACKGROUND

Embodiments relate to gun-fired projectiles.

Many grenades are capable of a limited flight path over an arch shaped flight trajectory. Grenades are typically gun-fired. By way of example, grenades may be launched from an M320 grenade launcher with existing AN/PEQ-15, AN/PEQ-2A and LA-5A/PEQ laser pointers/illuminators. A range of the launcher is dependent on the type of launcher used. As a non-limiting example, the launcher may launch grenades out to about 1500 meters.

There is a need to extend the range of gun-fired projectiles such as grenades or allow a shooter to be out of sight of the target.

SUMMARY

Embodiments relate to a projectile system, method and computer program product for controlling the flight of a projectile to make a course change by approximately 90°, greater than 90° or up to 90°. In an embodiment, the projectile system comprises a gun-fired projectile having a body including an aft section and a forward section, at least one tail fin coupled to the body at the aft section, a motor configured to fire during a first flight phase and fire during a second flight phase and at least one controllable canard located on the body. The projectile system includes one or more processors configured to determine a turn maneuver profile to a target during the first flight phase, produce control signals to destabilize the body, create a pitch attitude change for the turn maneuver profile and effectuate a turn of the projectile in a direction corresponding to the turn maneuver profile during a turn phase of the first flight phase. The processors control the motor to start the second flight phase to the target after the turn.

In an embodiment, a method is provided comprising: providing a gun-fired projectile having a body including an aft section and a forward section, at least one tail fin coupled to the body at the aft section, a motor configured to fire during a first flight phase and fire during a second flight phase and at least one controllable canard located on the body. The method includes determining, by one or more processors, a turn maneuver profile to a target during the first flight phase. The method includes producing, by the one or more processors, control signals to destabilize the body, create a pitch attitude change for the turn maneuver profile and effectuate a turn of the projectile in a direction corresponding to the turn maneuver profile during a turn phase of the first flight phase. The method comprises controlling, by one or more processors, the motor to start the second flight phase to the target after the turn.

In an embodiment, a computer program product for controlling flight of a projectile to make a course change by approximately 90°, greater than 90° or up to 90° is provided. The computer program product comprising a non-transitory computer-readable medium having instructions embodied thereon, which when executed by a computer cause the computer to implement a method, the method steps comprising: determining a turn maneuver profile to a target during a first flight phase; producing control signals to destabilize the projectile, to create a pitch attitude change for the turn maneuver profile and effectuate a turn of the projectile in a direction corresponding to the turn maneuver profile during a turn phase of the first flight phase; and controlling the motor to start the second flight phase to the target after the turn.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 6 illustrates a flowchart of a method to control the projectile to make a 90° vector change in flight;

DETAILED DESCRIPTION

Figure 1:
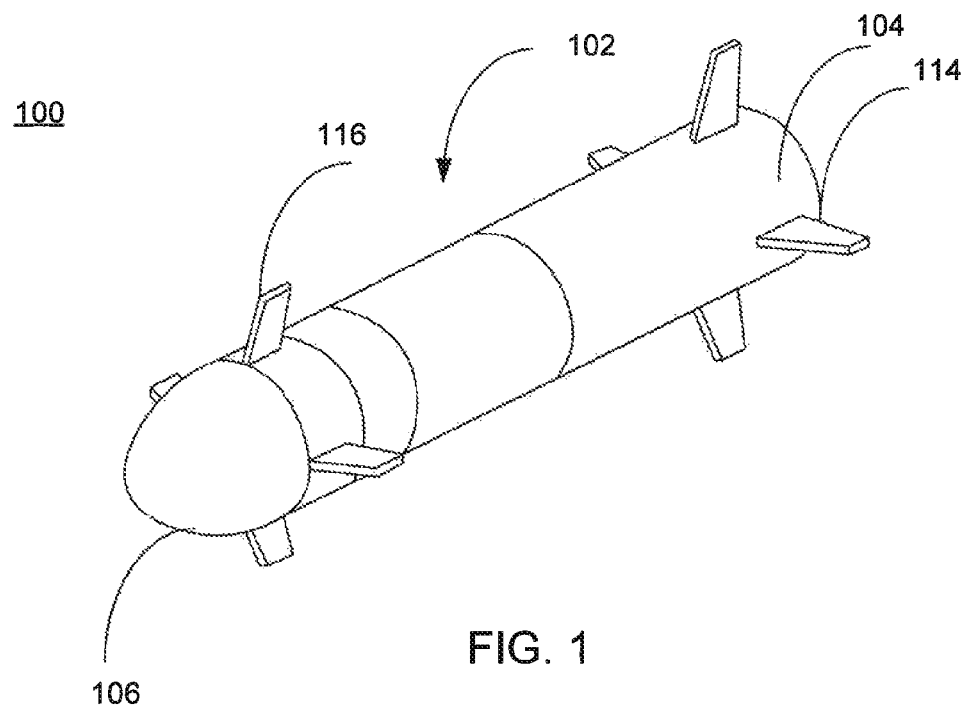
FIG. 1 illustrates a perspective view of a projectile.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

FIG. 1 illustrates a perspective view of a projectile 100. The projectile 100 may comprise a body 102 and at least one tail fin 114. The body 102 may comprise an aft or end section 104 and a forward section 106. The at least one tail fin 114 may located on the aft section 104 of the body 102. The at least one tail fin 114 may be foldable and may be configured to unfold when the projectile 100 is launched. The at least one tail fin 114 may be a stabilizing tail fin. In an embodiment, the tail fin may be stationary.

The projectile 100 may comprise at least one canard 116. The at least one canard 116 may be located adjacent to the forward section 106 of the body 102. The forward section 106 has a generally nose shape or conical shape. The at least one canard 116 may be foldable and may be configured to unfold during flight of the projectile 100 to provide for changing a projected vector of the body 102 and to effectuate instability in the projectile 100 during a turn phase. In an embodiment, there may be four canards. The canards may be controlled by canard control system 176.

Figure 2:
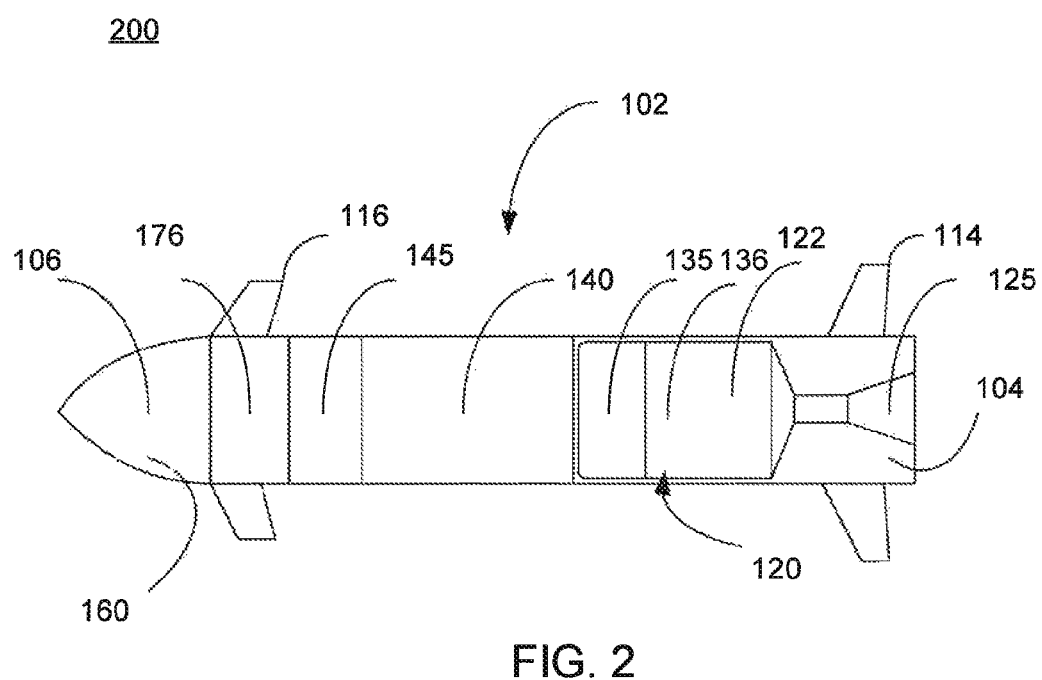
FIG. 2 illustrates a sectional view of the projectile system.

With reference to FIG. 2, a sectional view of the projectile system 200 is illustrated. The projectile system 200 may comprise projectile 100, a charge system 120 with a first propellant configured to push the body from a cartridge (not shown) holding the body 102 and a two-stage motor 122 mounted within the body 102. The two-stage motor 122 may be configured to provide for a firing stage with a main propellant charge 136 during a first flight phase and a second firing stage having a second pulse propellant charge 135 for another (second) flight phase once the projected vector (course) is changed as will be discussed in more detail later in relation to FIG. 10. The two-stage motor 122 includes a thrust nozzle 125 expelling through the aft end 104 to propel the body 102 forward at a velocity according to the motor's capability in the first flight stage and the second flight stage.

An embodiment projectile 100 may be, but not limited to, a rocket propelled grenade, such as, a 40 mm (millimeter) grenade. The projectile 100 may be configured to be fired from a launcher such as a gun-fired launcher. By way of non-limiting example, the launcher may be a M320 grenade launcher with existing AN/PEQ-15, AN/PEQ-2A and LA-5A/PEQ laser pointers/illuminators. A range of the launcher is dependent on the type of launcher used. As a non-limiting example, the launcher may launch grenades out to about 1500 meters. The cartridge (not shown) to house the projectile 100 may be configured to be compatible with a gun-fired launch. The projectile 100 may travel shorter or longer distances based on the motor capacity and the control flight of the projectile as will be discussed further.

As further illustrated in FIG. 2, the projectile system 200 may include a main propellant charge 136 for the two-stage motor 122 which may be provided to propel the projectile 100, such as downrange up to 1.5 km. As discussed further below, the main propellant charge 136 may be used during flight of the projectile 100. The projectile system 200 may include a second pulse propellant charge 135. The second pulse propellant charge 135 may be used once a course correction (i.e., 90-degree course correction) is made to increase velocity of the projectile 100 which was slowed during the course change (i.e., 90-degree course change).

The projectile 100 may include a warhead 140 and battery 145, the battery 145 powering the electronics of the projectile 100. The warhead 140 may comprise a fuse and warhead variant from other similar designs realized by ones skilled in the art. As a non-limiting example, a fused warhead 140 for anti-personnel and light materiel may be used. The projectile system 100 may also include electronics and/or a control system 160 as will be described in more detail in relation to FIG. 9. By way of non-limiting example, the electronics may comprise an imaging system such as, but not limited to, a filtered CCD or CMOS camera (cell phone grade), which may be used to detect a laser illuminated target.

In an embodiment, in the area of the at least one canard 116, the canard control system 176 may be housed. The canard control system 176 may be configured to control positioning of the at least one canard 116 to provide for maneuverable turn up to about 90°. In an embodiment, the maneuverable turn may be greater than 90° or less than 90°. The projectile 100 may have, by way of non-limiting example, a diameter of about 40 millimeters (mm), a length of about 299 mm, and a mass of about 1 kilogram or less. In an embodiment, the turn angle may be approximately 90°.

Thus, the projectile 100 may be deployed and operated with a three propellants (i.e., main propellant charge 136, the second pulse propellant charge 135 and an optional propellant charge for launching the projectile) ignited at certain phases during operation. The optional propellant (not shown) provides for charge that pushes the projectile 100 out of the cartridge (not shown) holding the projectile 100 and clear of the barrel of the launcher. This propellant 100 may be located in a base of the shell or cartridge (not shown). The projectile 100 may then comprise a two-stage motor 122 built into it with one stage provided for downrange flight and another stage provided for post turn acceleration to a target. The term projectile 100 and projectile system 200 may be used interchangeably.

Figure 3:
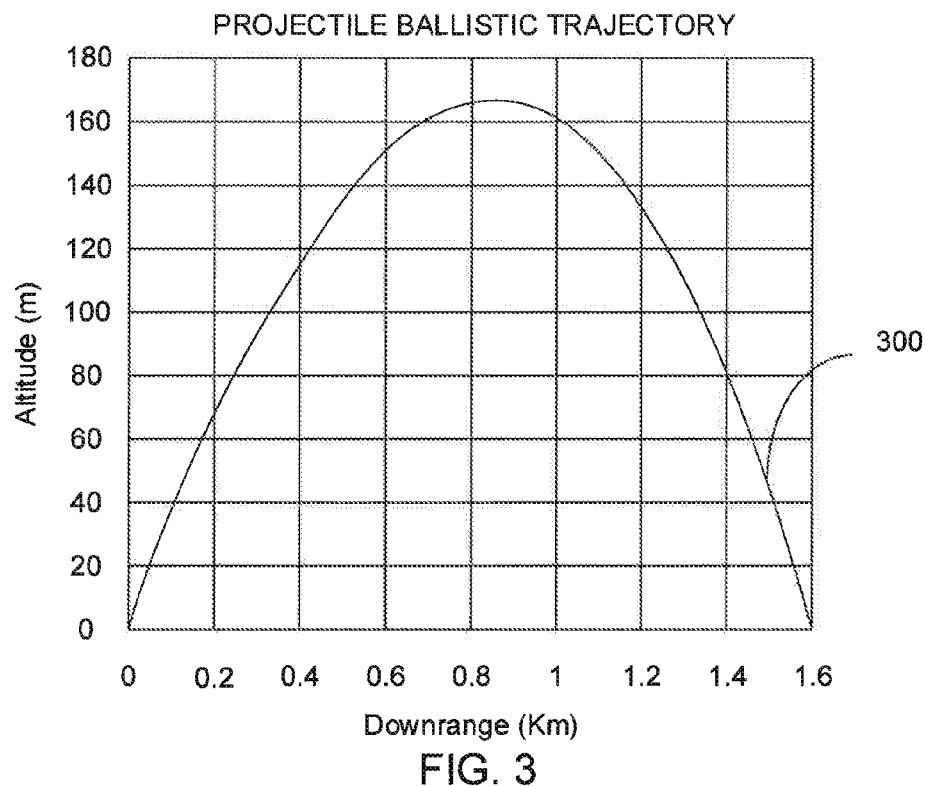
FIG. 3 illustrates a non-limiting curve representation of a projectile ballistic trajectory in altitude (meters) versus downrange distance (kilometers)

FIG. 3 illustrates a non-limiting representation of a projectile ballistic trajectory 300 in altitude (meters) versus downrange distance (kilometers). The graph illustrates a trajectory 300 of a potential flight path or typical fly-out taken by a launched projectile 100, such as without limitation, a rocket propelled grenade. The altitude is represented in meters. The downrange parameter is represented in kilometers (kin). The example trajectory 300 has a peak above 160 meters with a downrange limit of 1.5-1.6 km. In FIG. 3, the trajectory 300 represents a typical fly-out of a projectile 100 when the flight path is not altered to perform a dynamic turn maneuver profile. In operation, projectile 100 may be capable of a flight path that tracks some or all of the example projectile ballistic trajectory provided the projectile is not given a turn command.

In an embodiment, the flight path may only use the propellant of the first flight charge until it is expended. In an embodiment, the flight path may use the propellant of the first flight charge and the second flight charge to until expended to complete a flight path consistent with the profile of the trajectory 300.

Figure 4:
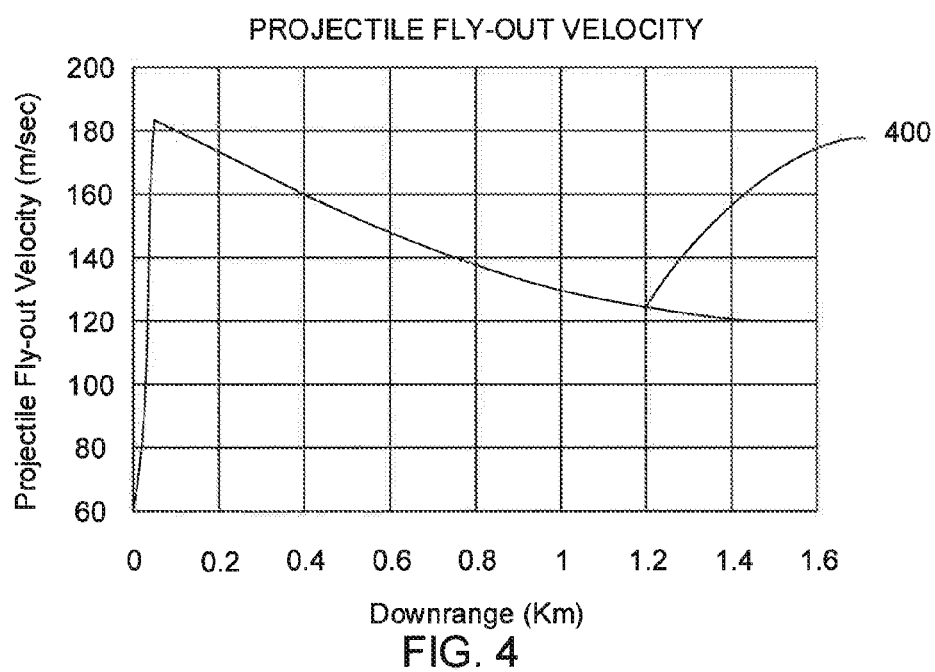
FIG. 4 illustrates a non-limiting curve representation of a projectile fly-out velocity (meters per second) versus downrange distance (kilometers)

FIG. 4 illustrates a non-limiting curve 400 representation of a fly-out velocity in meters per second (m/sec.) versus downrange distance in kilometers (km). In this graph, the curve 400 represents a typical fly-out velocity of a projectile 100 when the flight path is not altered to perform a dynamic turn maneuver profile. In operation, projectile 100 may be capable of a flight path that tracks some or all of the example projectile fly-out velocity provided the projectile 100 is not given a turn command.

Figure 5:
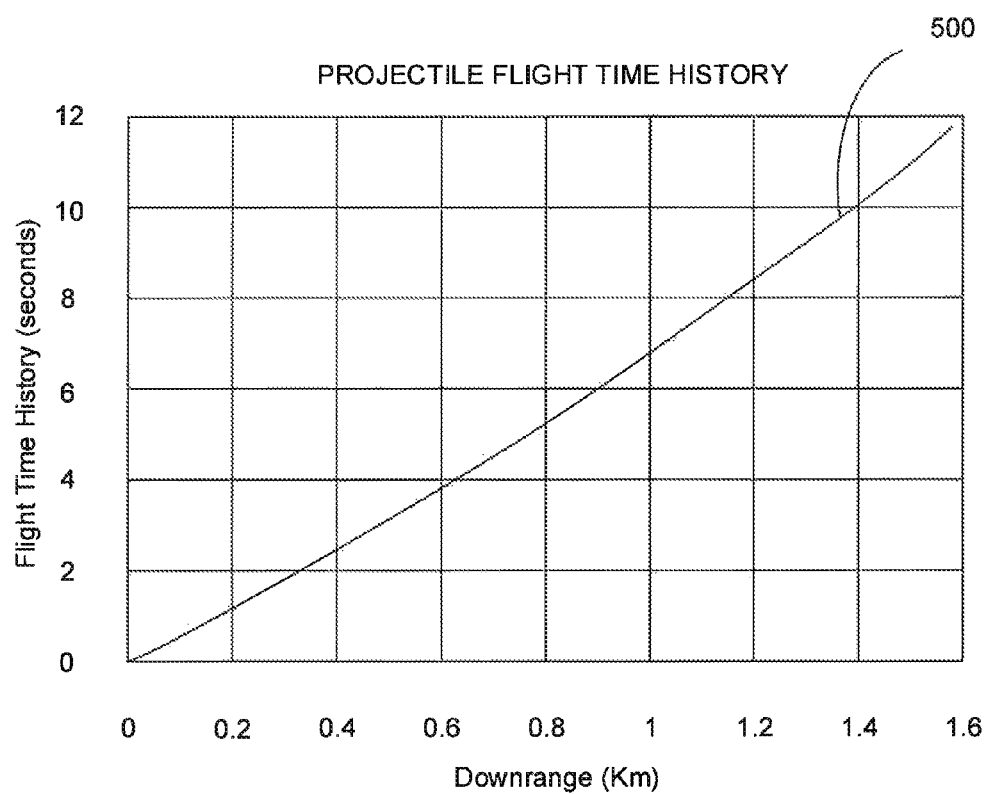
FIG. 5 illustrates a non-limiting curve representation of a projectile flight time history (seconds) versus downrange distance (kilometers)

FIG. 5 illustrates a non-limiting curve 500 representation of flight time history in seconds versus downrange distance in kilometers. In this graph, the curve 500 represents a typical fly-out velocity of a projectile 100 when the flight path is not altered to perform a dynamic turn maneuver profile. In operation, projectile 100 may be capable of a flight path that tracks some or all of the example projectile flight time history provided the projectile 100 is not given a turn command.

The projectile 100 may support a current operation environment, namely, currently used launchers. The projectile 100 may be a gun-fired and self-propelled bullet. The projectile 100 may be self-arming and actuated on fire by acceleration. The projectile 100 may comprise a self-destruct mode to initiate about 1 to 2 seconds after longest fight of time. Additionally, the projectile 100 may be receive a command to self-destruct.

Referring now to FIG. 6, a flowchart of method 600 to control the projectile 100 to make a 900 vector change in flight is illustrated. The blocks of the method 600 may be performed in the order shown, in a different order and some blocks may be carried out contemporaneously. Additionally, one or more block may be added or omitted.

In an embodiment of operation, at block 602 the projectile 100 may be propelled to clear an end of the launcher using a launch propellant. Propelling the projectile 100 from the launcher may also be provided by having the projectile 100 pushed out of a cartridge (not illustrated) in which the projectile 100 is initially housed.

At block 604, upon clearing the launcher, at least one fins 114, such as without limitation, may deploy to stabilize the projectile 100 during flight. At least one canard located forward of the tail fins 114 at the forward section 106 may also be unfolded. At block 606, the primary pulse, or main, propellant charge 136 inside the projectile 100 ignites and accelerates the projectile 100 to provide propulsion downrange to the intended target. Downrange may be 1.5 km with at least one tail fin 114 extended for stability. At block 608, once the projectile 100 reaches the point where up to a 90-degree turn is desired, the canards may be extended or rotated to slow the projectile. The projectile's stability may be reduced to almost zero. The at least one canard 116 may then be deflected sufficiently so that a body pitch rotation is obtained by the projectile 100 to make the up to about 90° turn. The velocity will be significantly reduced at this point. At block 610, upon reaching the desired pitch over position (up to 90° turn), the second pulse propellant charge 135 inside the projectile 100 ignites and accelerates the projectile 100 to provide for regained flight velocity at a new vectored direction to the target.

In another embodiment of operation, both the at least one tail fin 114 and at least one canard 116 may be extended at launch and together provide neutral stability. A microelectromechanical system (MEMS) inertial rate sensor may be used to provide stability and artificial damping. When the projectile 100 reaches the downrange point where a turn, such as, a 90-degree turn is desired, the artificial damping is removed (or ceases to operate) so that the projectile's stability is reduced to almost zero. The at least one canard 116 is then deflected sufficiently to allow a body pitch rate and rotation to, for example, 90° to be obtained which also results in the velocity of the projectile 100 to be significantly reduced at the same time. The second pulse propellant charge 135 is initiated, or the second pulse of the motor is initiated, to provide for regaining a sufficient velocity for additional maneuvering. Artificial damping is also resumed.

Though two embodiments of operation are disclosed, a combination of either is possible. As disclosed, a three-pulse approach may be used. A first pulse (acceleration of the projectile 100) occurs at launch. A second occurs during a first flight phase, and a third occurs during a terminal maneuver (such as, after a 90-degree course change has taken place).

Figure 9:
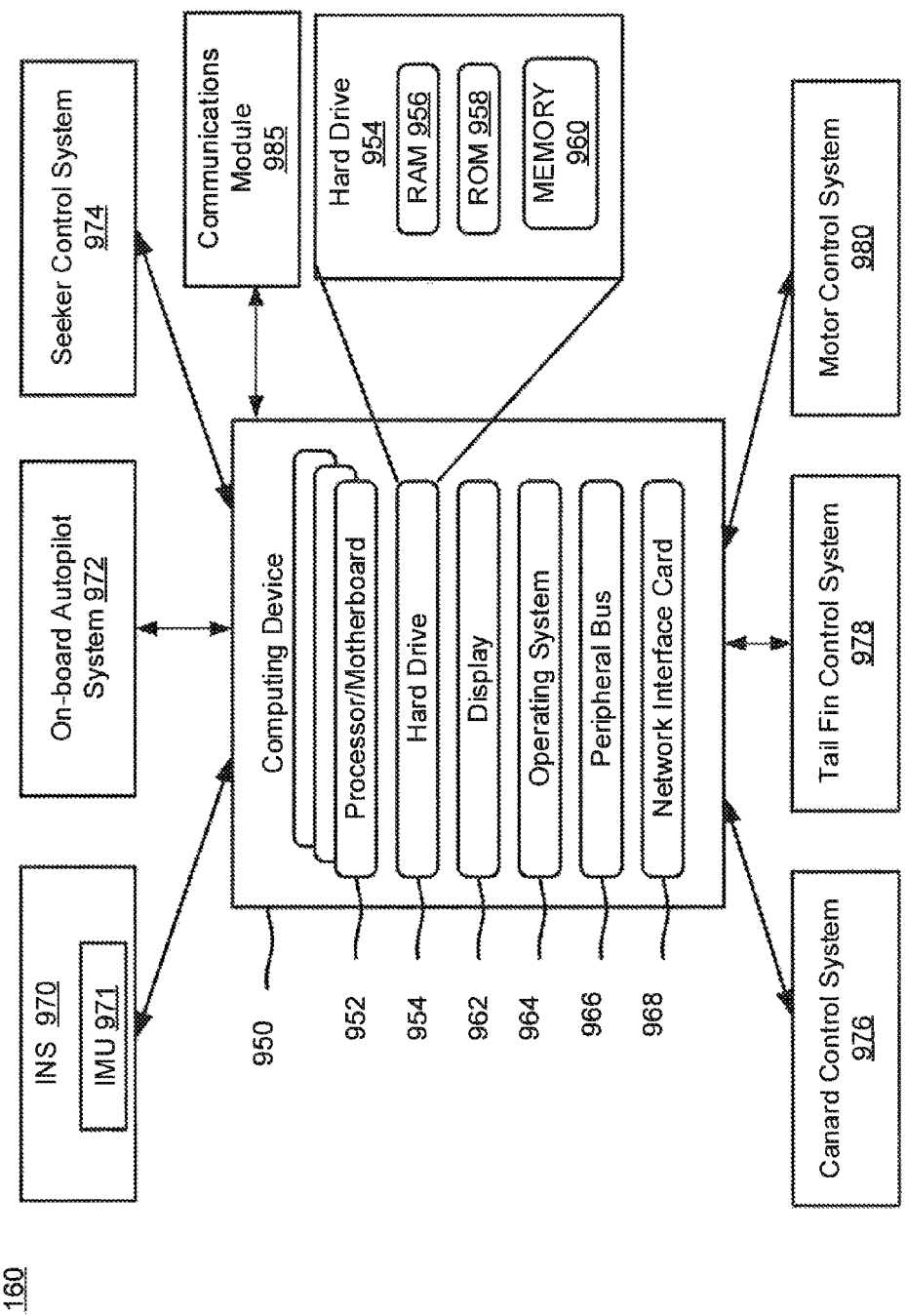
FIG. 9 illustrates a schematic diagram of the control systems of the projectile.

Referring now to FIG. 9 the control system 160 is shown including electronics for carryout the processes described herein. The control system 160 may comprise, in a basic configuration, computing device 950. The computing device 950 may include a mobile computing device. Computing device 950 may include one or more processors 952 and system memory in hard drive 954. Depending on the exact configuration and type of computing device, system memory may be volatile (such as RAM 956, non-volatile such as read only memory (ROM 958), flash memory 960, and the like) or some combination of the two. System memory may store operating system 964, one or more applications, and may include program data for performing processes or methods 600, 1000 and 1012. The computing device 950 and other electronics of the control system 160 may carry out one or more blocks of processes 600, 1000 and 1012. Computing device 950 may also have additional features or functionality. For example, computing device 950 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage are all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

Computing device 950 may also include or have interfaces for input device(s) (not shown) such as a keyboard, mouse, pen, voice input device, touch input device, etc. The computing device 950 may include or have interfaces for connection to output device(s) such as a display 962, speakers, etc. The computing device 950 may include a peripheral bus 966 for connecting to peripherals. Computing device 950 may contain communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device 950 may include a network interface card 968 to connect (wired or wireless) to a network.

Computer program code or computer program product for carrying out operations described above may be written in a variety of programming languages including, but not limited to, a high-level programming language, such as C or C++, for development convenience. In addition, computer program code or computer program product for carrying out operations of embodiments described herein may also be written in other programming languages such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code or product in which a program of the embodiments is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD).

The embodiments may be configured for use in a computer or a data processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps for creating a new machine. The general purpose computer becomes a special purpose computer once it is programmed to perform particular functions pursuant to instructions from program software of the embodiments described herein. The instructions of the software program that carry out the algorithm/ steps electrically change the general purpose computer by creating electrical paths within the device. These electrical paths create a special purpose machine for carrying out the particular algorithm/steps.

The control system 160 may include an on-board autopilot system 972 and an inertial navigation system (INS) 970. The INS 970 may include an inertial measurement unit (IMU) 971. The IMU 971 permits sensing of the projectile's 3-axis (x, y, and z) linear accelerations and 3-axis (x, y, and z) angular rates to determine the projectile's velocity and orientation. The control system 160 may include a global positioning system (not shown). The on-board autopilot system 972 receives information from the inertial navigation system 970 and the computing device 950 to fly the projectile (i.e., projectile 100, 700 or 800) to the target including making a turn, such as, up to a 90° or more in the flight. The turn sometimes referred to as a course correction. The IMU 971 may include one or more gyroscopes and one or more accelerometers. The IMU 971 may include one or more magnetometers.

The IMU 971 may be a microelectromechanical system (MEMS) inertial rate sensor. The IMU 971 may be used to provide control signals for controlling stability and artificial damping. As previously described, when the projectile 100 reaches the downrange point where a turn, such as, a 90-degree turn is desired, the artificial damping is removed (or ceases to operate) so that the projectile's stability is reduced to almost or near zero.

The control system 160 may include a canard control system 976 and a tail fin control system 978. The tail fin control system 978 may include drive motors to control the movement of the tail fins 114 such as to deploy or steer the tail fins for stability. Alternately, the tail fins 114 may automatically deploy after being launched from the launcher. The tail fin control system 978 may be control the at least one tail fin for flight stability and control. The tail fin control system 978 may be controlled when destabilizing of the projectile during the turn phase. The on-board autopilot system 972 includes guidance electronics which interfaces with the tail fin control system 978 to communicate signals for aerodynamic control and stability or destabilization of the projectile in the turn phase or as needed for flight.

The canard control system 976 may include drive motors to control the movement, such as, the deployment and deflection (or rotation) of the at least one canard 116 to cause the projectile 100 to fly to the target according to the projected flight path. Alternately, if a turn is needed, during the turn phase, the canard control system 976 controls the at least one canard 116 to become neutral or unstable and to turn the projectile body, as will be described in more detail later. The on-board autopilot system 972 includes guidance electronics which interfaces with the canard control system 976 to communicate signals for aerodynamic control of the projectile. The canard control system 976 may control the deflection or folding and unfolding of the at least one canard 116 to fly or guide the projectile according to the projected flight path or for destabilization of the projectile in the turn phase or as needed for flight.

The control system 160 may include a seeker control system 974 which commences after the launch phase. The seeker control system 974 may be used to locate a target such as during a target acquisition phase. In an embodiment, the seeker optics 795 (FIG. 7A) may be coupled to a seeker control system 974. Laser pulses or optical illumination on the target may be captured by the seeker optics 795. The seeker control system 794 may include algorithms for detection and track of the target from which steering commands may be generated and coordinated with the on-board autopilot system 972.

The control system 160 may further include a communications module 985 to receive an up-link command which may serve as the turn command. As can be appreciated, the project may receive other commands such as without limitations, self-destruct commands. The turn command may be generated by the control system 160 based on the projected flight path to the target. In operation the projectile 100 is configured for dual modes of operation. In a first mode, the projectile fly the flight path similar to the path of FIGS. 3-5.

Multiple variations may modify the curves based on the projected flight, angle of attack and target location. In a second mode, the projectile is configured to dynamically adjust the flight path with up to 90° turn. In an embodiment, the turn may be greater than 90° to hit a target.

In an embodiment, the control system 160 may generate a turn command. By way of non-limiting example, a flight path may be pre-programmed in the control system 160. The control system 160 based on the pre-programmed flight may determine the need for a turn and generate a turn command. Alternately, the projectile may receive an up-link control signal via communications module 985 to dynamically change the flight course. A course change may be needed based on target acquisition.

During flight it may be determine that the path to the target may require a turn which is substantially 90° or some other angle. Then, the lead time-to-distance for a turn maneuver profile is determined (See block 1010). If there is enough propellant charge in the main propellant charge, the turn phase may commence. For example, the turn from a flight path angle controlled, by the on-board autopilot system 972, to accomplish a turn of substantially 90° may require, by way of non-limiting example, 430 feet (ft.) after the turn command is received. In general, the lead time-to-distance is the amount of time necessary to conduct a turn for a particular turn maneuver profile.

By way of non-limiting example, the turn maneuver profile may include a direction parameter such as whether the turn is left, right, up or down. The turn maneuver profile may include an angle parameter such as without limitation whether the turn angle of the turn such as without limitation, an angle of 90°, an angle that is greater than 90° or an angle which is less than 900. The profile may include the pitch attitude parameter for the turn maneuver profile and the side displacement parameter. The turn maneuver profile may require other parameters such as without limitations, weight of the projectile and current speed of the projectile.

Following the launch of the projectile such as a rocket propelled grenade from a M320 grenade launcher, the motor 122 is controlled by motor control system 980. The timing of the motor 122 may be controlled to ignite a first main propellant charge 136 of the motor 122 to allow the grenade to accelerate to a higher flight velocity. The projectile or grenade's tail fins are also extended following the launch for stability purposes. The motor control system 980 also controls the motor 122 to ignite the second pulse propellant charge 135.

At a predetermined position, or an up-link command is provided, the at least one canard 116 is deployed, reducing the projectile's stability to a neutral, or slightly unstable, condition. An inertial sensor that permits sensing of the grenade's 3-axis liner accelerations and 3-axis angular rates is utilized (with an onboard autopilot system 972 and canard control system 976) to assist in maintaining control of the projectile or grenade during the very low stability phase of the flight. The at least one canard may then be deflected to achieve a turn in the direction of the desired flight in accordance with the turn maneuver profile. Once the projectile or grenade has completed the turn, the second pulse of the rocket motor 122 is ignited to accelerate in the desired flight direction. While this maneuver is progressing, the projectile or grenade's turn may actually exceed the desired (predetermined) turn angle so that a small component of the thrust will be used to reduce the projectile or grenade's forward inertial velocity to near zero. The canard control system 976, autopilot system 972 and inertial sensor (of the INS 970) may be used to provide stabilized flight on the desired course to the target or target area.

The control system 160 includes several system described above. Each of those system may have dedicated electronics, hardware, software, firmware, memory and/or processors for carrying out the specific function of that system.

Figure 7A:
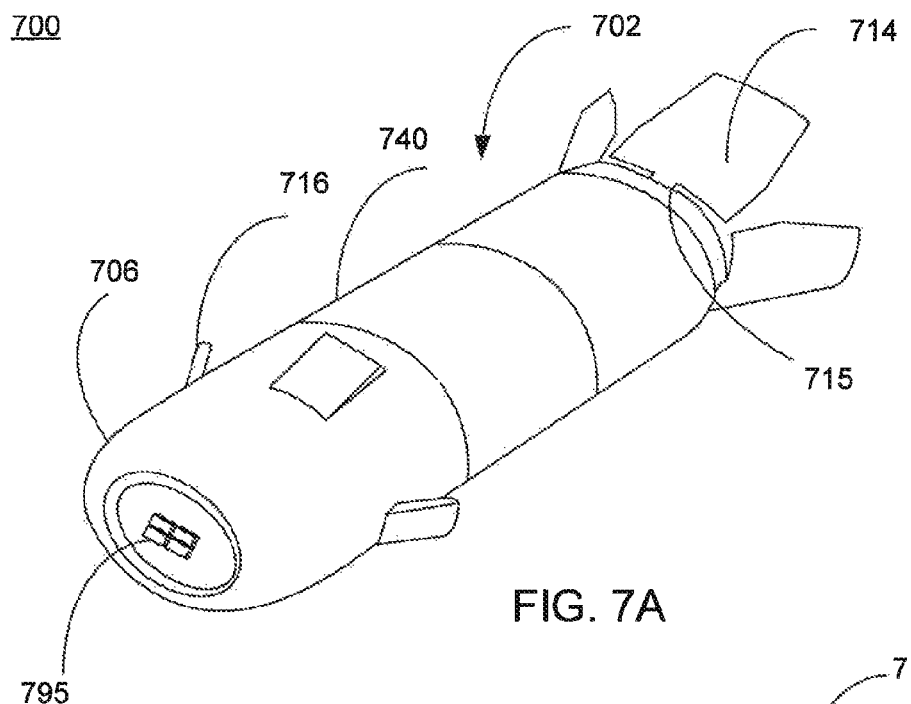
FIG. 7A illustrates a perspective view of another projectile.
Figure 7B:
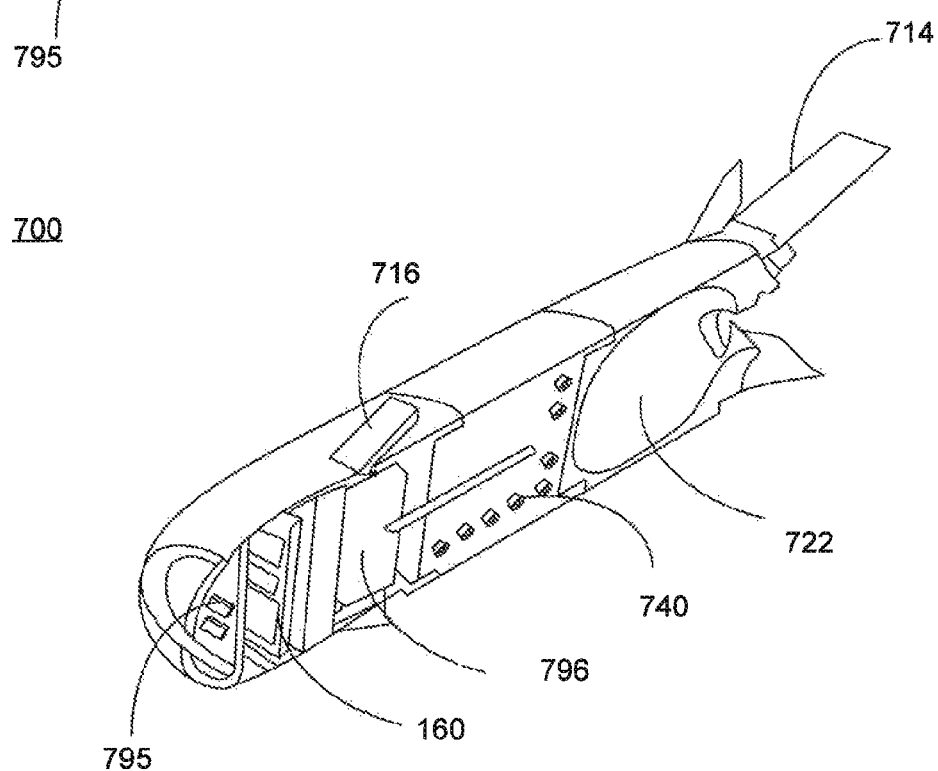
FIG. 7B illustrates a cross sectional view of the projectile FIG. 7A.

FIGS. 7A and 7B illustrates perspective and sectional views of another projectile 700. In the embodiment of FIGS. 7A and 7B, the plurality of tail fins 714 are foldable. The plurality of tail fins 714 are oriented in a direction which provided a skirt around the aft end the projectile body 702. The fins 714 have a width which is perpendicular to the longitudinal axis of the projectile body 702. The fins 714 have a folded position which orients the length of the fin essentially parallel with the longitudinal axis of the projectile body 702. When folded, the tail fins 714 extend past the aft or rear end of the projectile body 702.

In an embodiment, the width of the tail fins 714 may have a curvature which is curved to track the curvature or shape of the projectile body 702. When the tail fins 714 are unfolded, the fins 714 radiate from the projectile body 702 and may extend the longitudinal length of the projectile 700 at an obtuse angle. The tail fins 712 may be extended and rotated to a position that may be essentially perpendicular to the body 702 at a right angle and other intermediary angles. The fins 714 may be attached to the body 902 by tail fin hinges 715. The tail fin control system 978 may controls the rotation of the tail fin hinges 715 via drive motors (not shown).

The projectile 700 includes a forward end 706 having at least a portion of the control system 160. The canards 716 are located in the forward section 706. The canards 716 are foldable or rotatable. Canards 716 may be in a folded position while stowed. The tip of the forward end 706 may include seeker optics 795 coupled to a seeker control system 974 (FIG. 9). The fuselage of the body 702 may include components of the control system 160 (FIG. 9), a warhead 740, battery and motor 722 described above in relation to FIGS. 1 and 2. In the embodiment, the canards 716 are control by canard control system 796. The canards 716 are shown oriented in the direction as the tail fins 714. Whereby, in a folded position, each canard 716 may have a length which is oriented parallel to the longitudinal axis of the projectile body 702. Each canard 716 may be at an acute angle with respect to the longitudinal axis of the projectile body 702, as shown. Each canard 716 may be controlled to be rotated to be substantially perpendicular to the longitudinal axis of the projectile body 702. The orientation of the canard 716 may be a function of flight control or destabilization.

Figure 8:
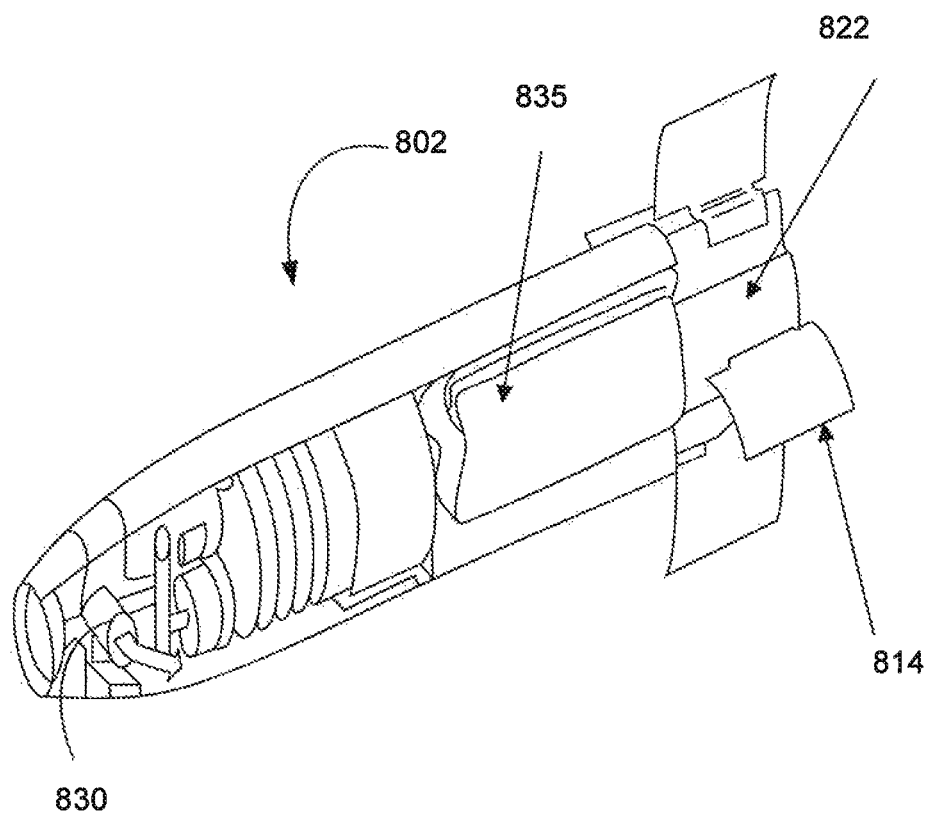
FIG. 8 illustrates a cross sectional view of yet another projectile.

FIG. 8 illustrates sectional views of another projectile 800. The projectile 800 is similar to projectile 700. Thus only the differences will be discussed. In the embodiment of FIG. 8, the plurality of tail fins 814 are foldable. The plurality of tail fins 814 are oriented with a width of the fin parallel to the longitudinal axis of the projectile body 802. The fins 814 have a folded position which orients the length of the fins such that they wrap around the body circumference. When the tail fins 814 are unfolded, the fins 814 radiate from the projectile body 802. The projectile 800 include a two-stage motor 822 with a main propellant charge (in the motor) and a second pulse propellant charge 836. In the illustration, motor(s) 802 for controlling the movement of the canards (i.e., canards 716) is shown.

The embodiments of FIGS. 7A, 7B and 8 include different body constructions and means of moving the canard and the tail fin. The different projectiles may be used with the projectile system including at least the control system 160, motor, etc.

Figure 10:
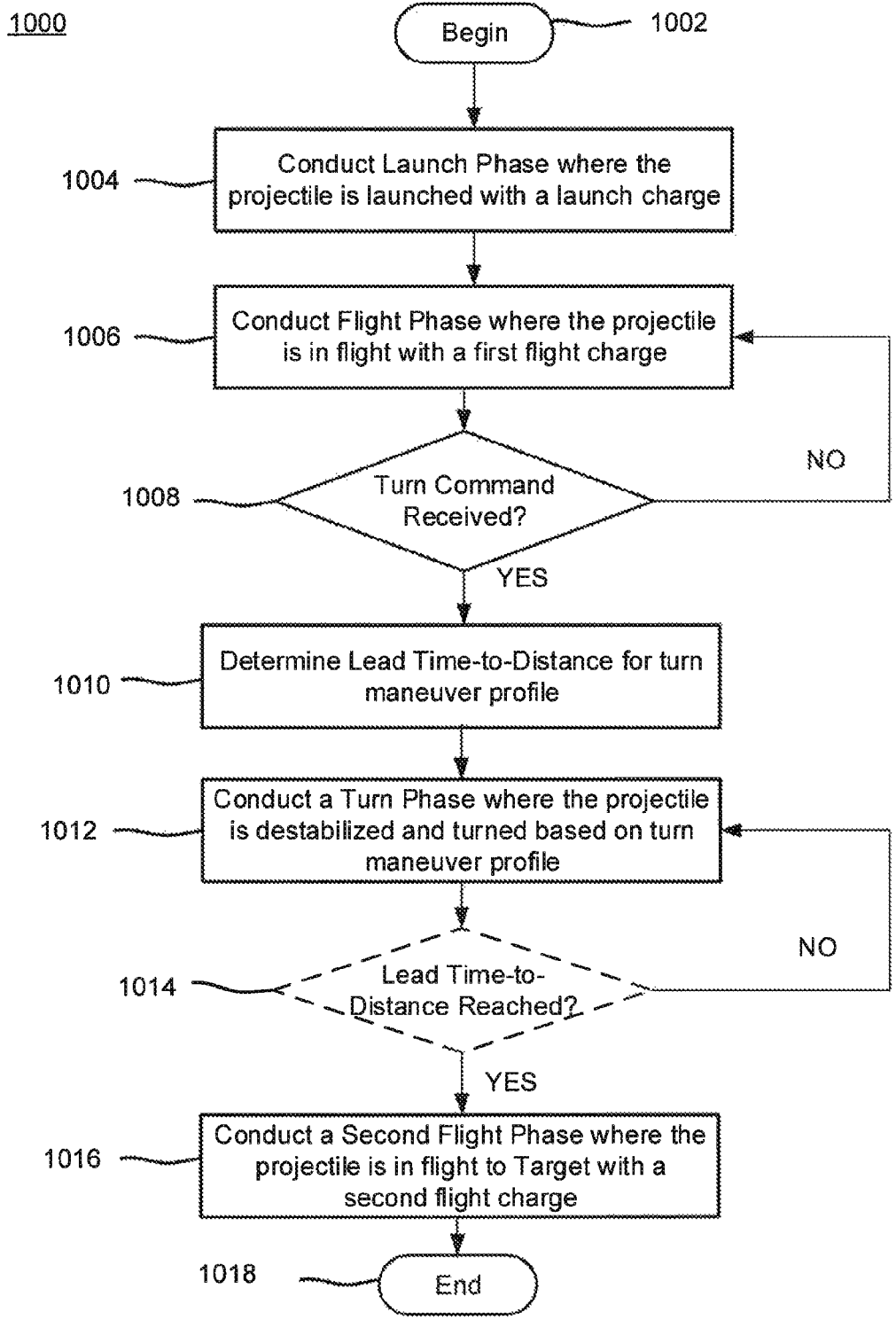
FIG. 10 illustrates a flowchart of the method for controlling the projectile for a dynamic flight path turn maneuver.

FIG. 10 illustrates a flow chart of a method 1000. The blocks of the method 1000 may be performed in the order shown, in a different order and some blocks may be carried out contemporaneously. Additionally, one or more block may be added or omitted.

The method begins at block 1002. At block 1004, in operation, a first launch phase is conducted where the projectile is launched with a launch charge such as from a cartridge. The projectile may be launched from a M320 or other military gun-fired launchers. Thus, the projectile may be a gun-fired projectile such as a rocket propelled grenade.

At block 1006, a first flight phase is conducted where the projectile is in flight with a first flight charge (i.e., main propellant charge 136). By way of non-limiting example, the projectile may travel a part of the curve 300 in FIG. 3. Specifically, the first portion of the curve 300 may be tracked or followed according to the flight path. The control system may be programmed to self-arm during block 1006.

At block 1008, the control system 160 may determine whether a turn command is received or generated. The turn command may be received in a number of ways. For example, the turn command may be received based on a pre-stored flight path based on the current location of the launcher or shooter. By way of non-limiting examples, the flight path may be modified during flight such as based on target acquisition by the seeker control system 974 or by receiving a command/instructions via the communications module 985.

If the determination is NO at block 1008, the method loops back to block 1006. In an embodiment, if a turn command is never received, the first flight charge may burn out. The projectile may be configured to self-destruct after a predetermined time. In an embodiment, if the turn command is not received, the method may be modified to skip (not shown) to block 1016 to ignite the second flight charge before burn out of the first flight charge so that the projectile extends the flight path to the target without a turn. The flight path with no turn may be without limitation, the flight path shown in FIG. 3.

If the determination at block 1008 is YES, the method proceeds to block 1010 where a lead time-to-distance is determined for the turn maneuver profile. At block 1012, the turn phase is conducted where the projectile is destabilized and turned based on the predetermined turn maneuver profile. Once the projectile has completed the turn, the second pulse of the motor 122 is ignited to accelerate in the desired flight direction. While this maneuver is progressing, the projectile's turn may in some instances may exceed the desired turn angle (i.e., turn angle of 90°) so that a small component of the thrust from the motor 122 may be used to reduce the projectile's forward inertial velocity. By way of non-limiting example, the forward inertial velocity may be reduced to zero or near zero. The canard control system 976, on-board autopilot system 972 and INS 970 may be used to provide stabilized flight on the new flight course to the target.

At block 1014, a determination is made whether the lead time-to distance is reached. If the lead time not reached, the method loop back to block 1012. While the process may use the lead time-to-distance for moving to the second flight phase, other parameter may be used. Furthermore, the determinations at block 1014 may be used for other controls.

If the determination is YES, at block 1014, a second flight phase is conducted, at block 1016, where the projectile is in flight to the target with the second flight charge (i.e., second pulse propellant charge 135) to target or until burnout. The control system 160 may be programmed to self-arm during the second flight phase. The method 100 ends at block 1018.

Figure 11:
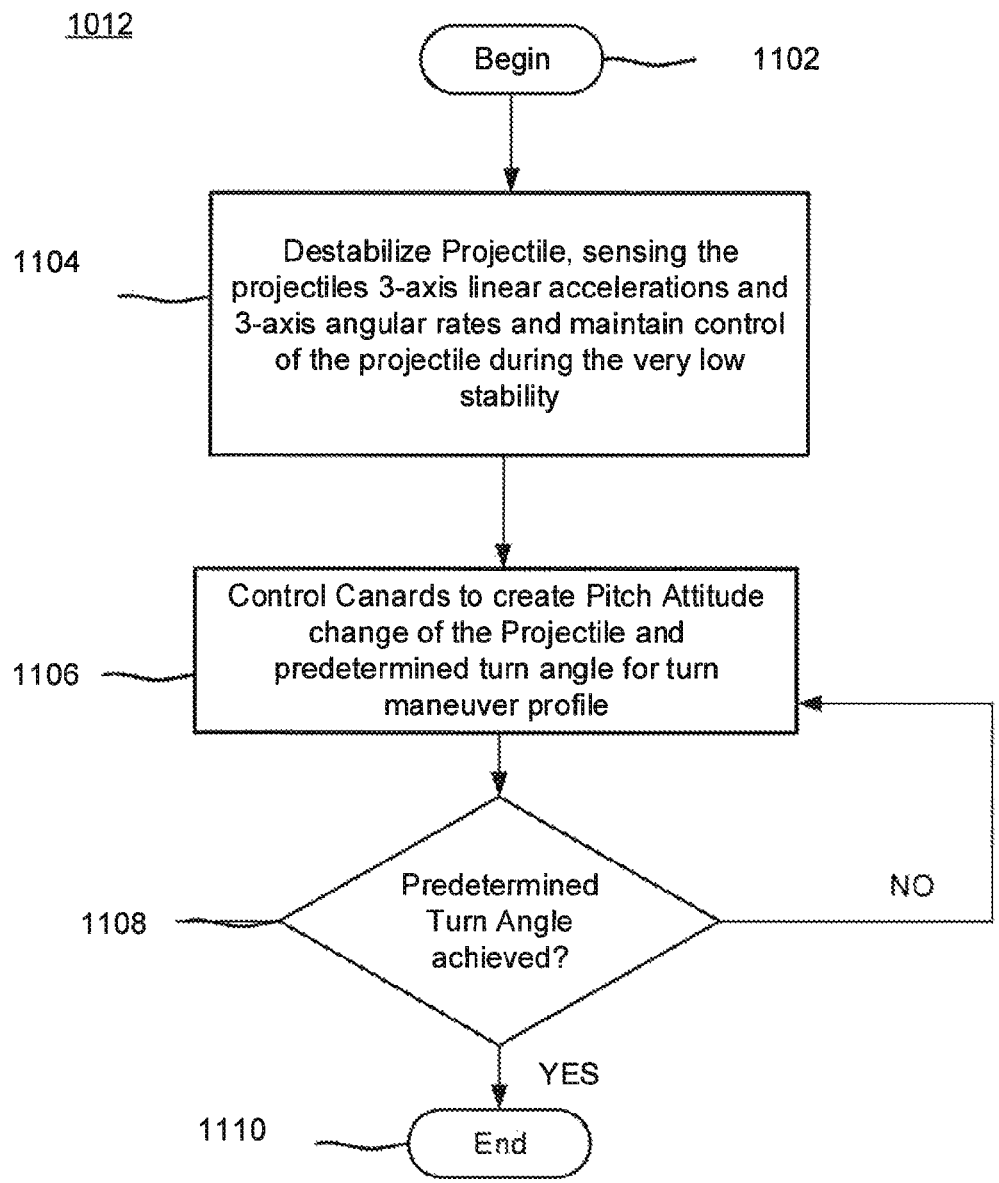
FIG. 11 illustrates a flowchart of the method for controlling the projectile during the turn phase.

FIG. 11 illustrates a flowchart of method of block 1012. The method begins at block 1102. At block 1104, the projectile is destabilized. Additionally, the projectile's 3-axis linear accelerations and 3-axis angular rates are sensed and the control of the projectile may be maintained during a very low stability or destabilized state. At block 1106, the canards are controlled so that a pitch attitude is created for the projectile. The canards are used to effectuate the turning motion of the projective in accordance with the predetermined turn maneuver profile.

At block 1108, a determination may be made whether a predetermined turn angle is achieved for the turn maneuver profile. If the determination is YES, the method of block 1012 is ended at 1110.

Figure 12:
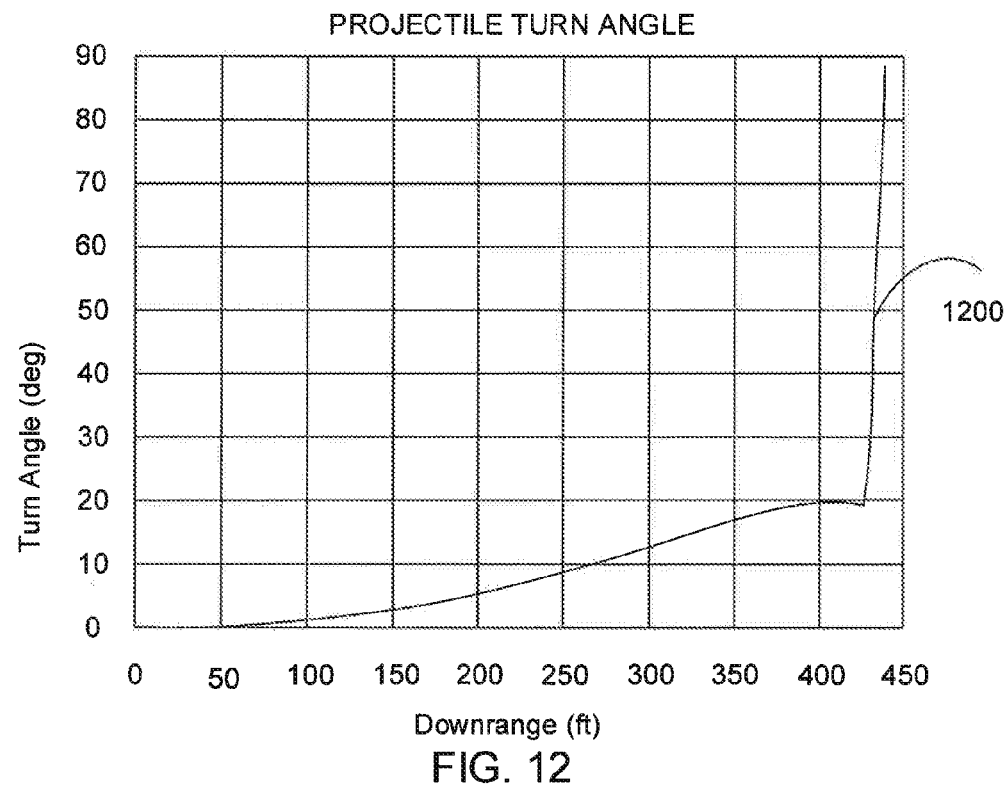
FIG. 12 illustrates a non-limiting representation of a turn angle (degrees) versus downrange distance (feet)

FIG. 12 illustrates a non-limiting representation of a turn angle 1200 in degrees versus downrange distance in feet (ft.) for a projectile command to conduct a dynamic turn maneuver profile. In FIG. 12, the turn from a flight path angle of 0 degrees to 90° requires approximately 430 feet (131 meters) after the turn command is received by the projectile or grenade.

Figure 13:
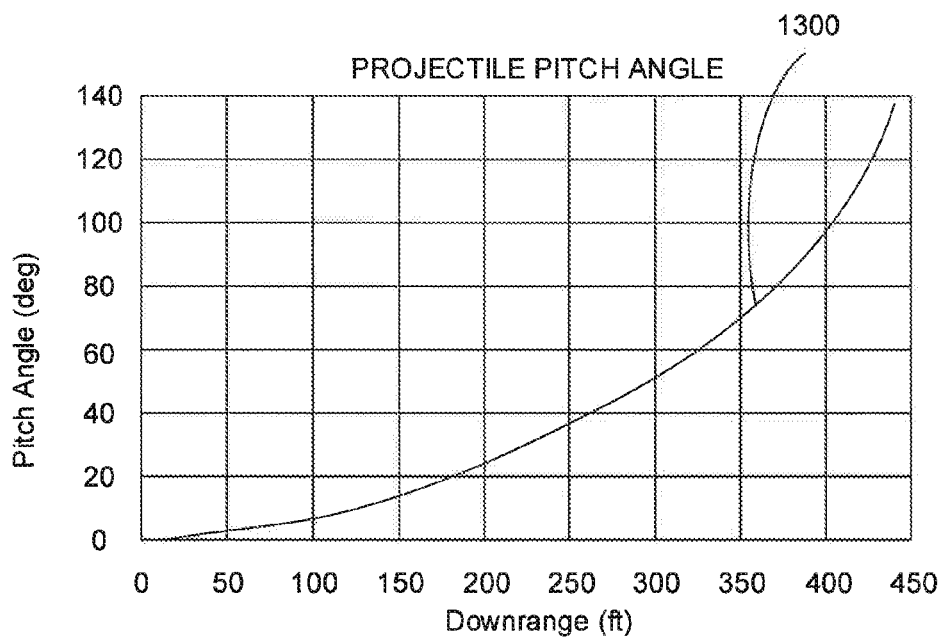
FIG. 13 illustrates a non-limiting representation of a pitch angle (degrees) versus downrange distance (feet)

FIG. 13 illustrates a non-limiting representation of a pitch angle 1300 in degrees versus downrange distance in feet (ft.) for a projectile command to conduct a dynamic turn maneuver profile. In FIG. 13, a pitch angle of approximately 135° may be required to slow the grenade and effect the 90° change in the flight path. The pitch angle may be an acute angle between the longitudinal axis of the projectile body and the direction of the wind relative to the projectile body.

Figure 14:
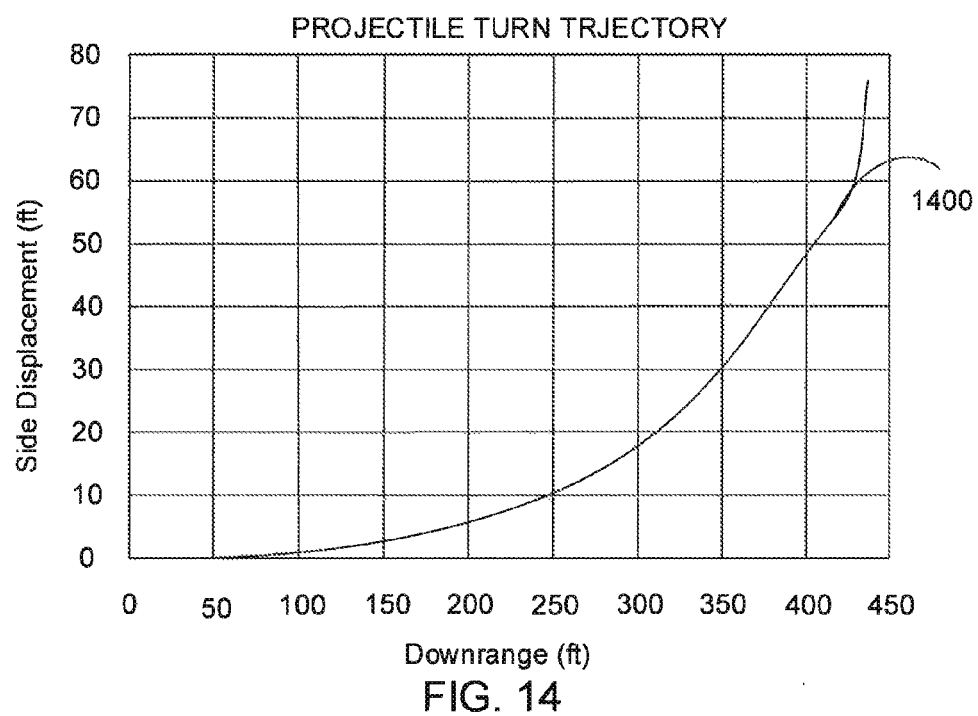
FIG. 14 illustrates a non-limiting representation of a side displacement (feet) versus downrange distance (feet)

FIG. 14 illustrates a non-limiting representation of a side displacement 1400 in feet (ft.) versus downrange distance in feet (ft.); for a projectile command to conduct a dynamic turn maneuver profile. In FIG. 14, a side, or lateral, displacement of approximately 75 feet may be required to effect the turn.

Figure 15:
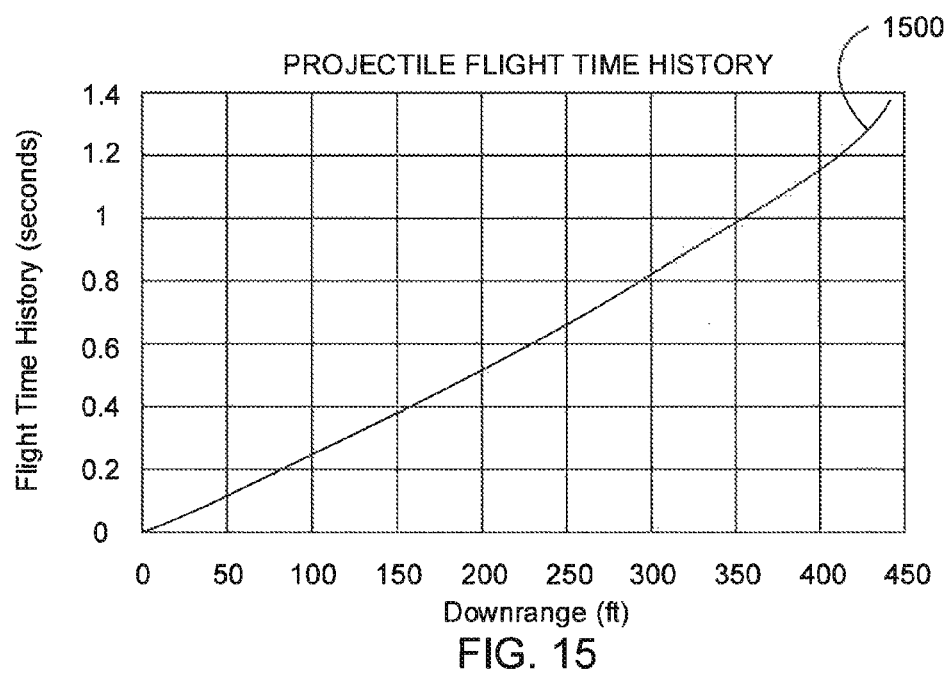
FIG. 15 illustrates a non-limiting curve representation of a flight time history (seconds) versus downrange (feet)

FIG. 15 illustrates a non-limiting curve 1500 representation of a flight time history in section versus downrange in feet (ft.); for a projectile command to conduct a dynamic turn maneuver profile. In FIG. 15, a time interval to effect the turn was approximately 1.4 seconds.

Figure 16:
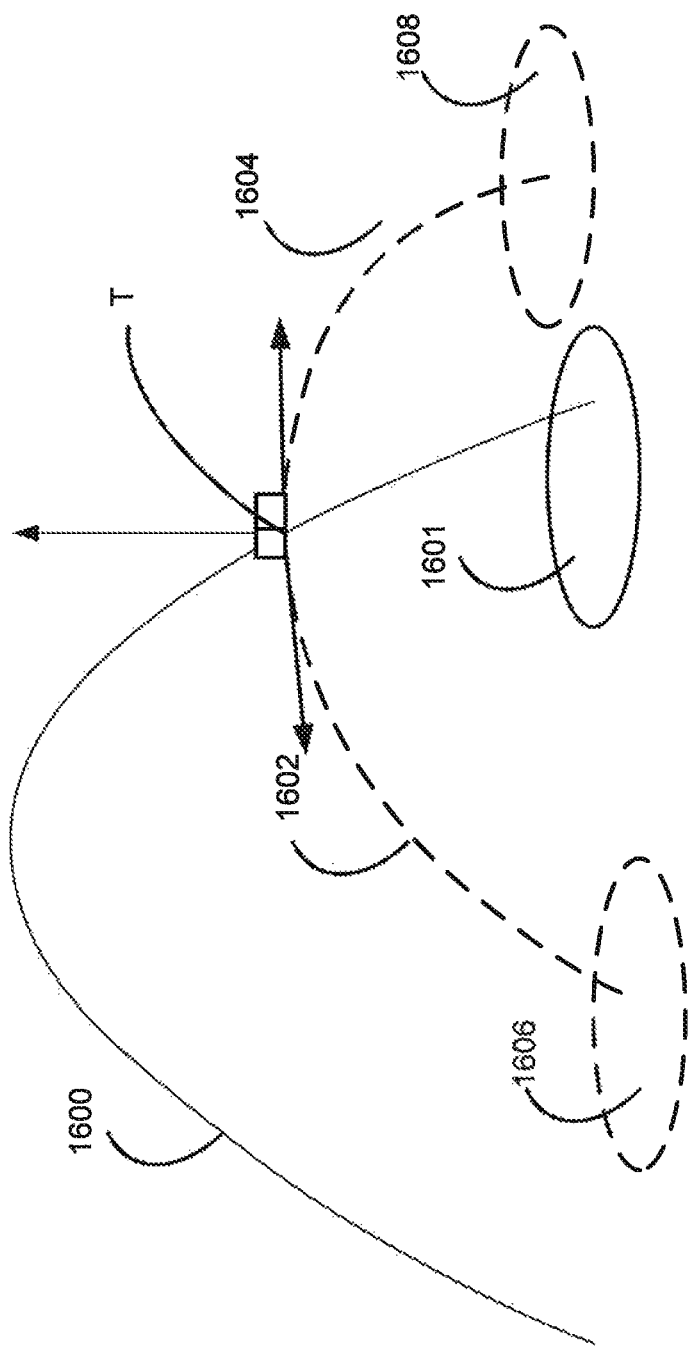
FIG. 16 illustrates non-limiting curves representing trajectory path course changes of the projectile.

FIG. 16 illustrates non-limiting curves representing a trajectory path course changes of the projectile. As can be appreciated, a projectile flight path may vary based on the angle of attack. In an embodiment, the projectile is configured to fly the flight path curve 1600 or variations thereof based on the programmed angle of attack. The on-board autopilot system 972, INS 970 and seeker control system 974 may be controlled to fly the projectile through a trajectory that hits a target 1601. The curve 1600, represented in a solid line, is similar of the curve of FIG. 3.

The flight path curve 1600 may vary based on the location of the intended target at 1601 in relation to the point of launch of the projectile. Because there are numerous possible flight paths, it is prohibitive to draw each and every one. In this representation, the solid line curve 1600 represents a flight path trajectory without a turn flown to target 1601.

The projectile when launched may also receive a turn command while in flight. The projectile may be configured to alter it flight path curve (i.e., flight path curve 1600) on-the-fly. Based on the turn command, a turn maneuver profile may be determined. For example, the turn may be 90°, less than 90° or greater than 90°. For simplicity, assume the turn angle is approximately 90°. Here, the turn begins at point T corresponding to the end of the lead time-to-distance. The turn may be at an angle to the right, left, or down, for example, based on the location of the target with respect to the launcher or in process flight path curve (i.e., flight path curve 1600). By way of non-limiting examples, two possible 90° flight path curves are represented as flight path curve 1602 to target 1606 and flight path curve 1604 to target 1608, both of which are represented as dashed line. Likewise, the targets 1606 and 1608 are represented as dashed lines. As can be appreciated, the curves 1602 and 1604 are for illustrative purposes and not to scale. Furthermore, the point T is shown for hitting targets 1606 or 1608. For other target locations, the point T may be at any location on the curve 1600 prior to the burn-out of the main propellant charge 136.

The curve 1602 is shown turned approximately 90° from the original projected trajectory path of curve 1600 to hit the target in circle (or ellipse) 1606. The curve 1604 is shown turned approximately 90° in a direction opposite the direction of the flight path curve 1602 to hit the target in dashed circle 1608.

Nonetheless, the curves are for illustrative purposes and not to scale. The curve 1604 is shown turned approximately 90° from point T from the original projected path to hit the target in dashed circle (or ellipse) 1608. It should be noted, from point T, the angle may be greater than 90° or less than 90°. The trajectory path of the curve 1602 and, alternately, curve 1604 may be based on the second pulse propellant charge 135, the on-board autopilot system 972, INS 970 and seeker control system 974 controlled to fly the projectile through a trajectory that hits targets 1606 and 1608, respectively.

The flight path curve 1600 to point T and the flight path curve 1602 to target 1606 may be pre-programmed in the memory (i.e., hard drive 954) or an up-link command may be received via the communications module 985. For example, the up-link command may provide coordinates to the target or an overall flight change to change the flight course requiring a turn of 90°, more than 90° or less than 90°.

Figure 17A:
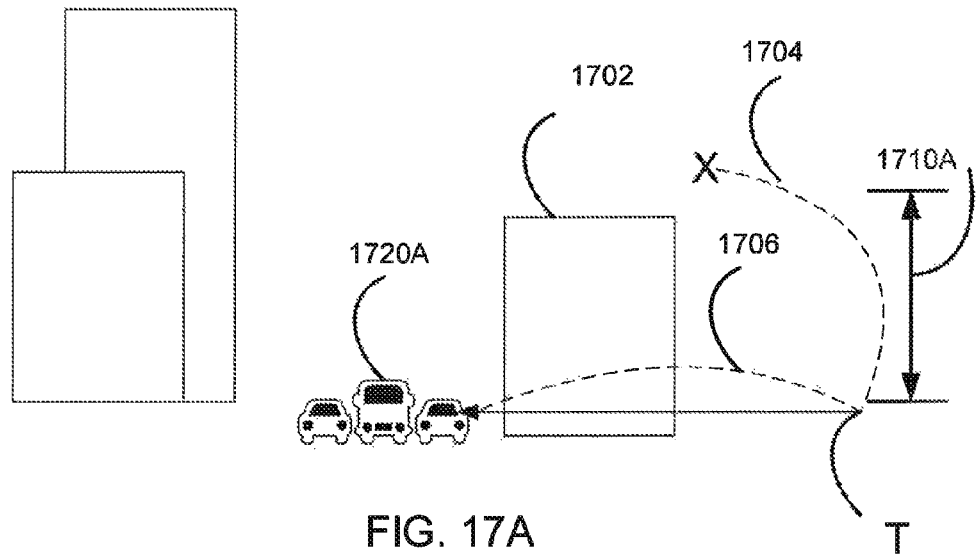
FIG. 17A illustrates a non-limiting representation of scenario for use of the projectile.

FIG. 17A illustrates a non-limiting representation of scenario for use of the projectile. The scenario include a plurality of buildings denoted as rectangular blocks. Between the buildings there is a target 1720A. In the scenario, "X" represents the launcher to launch the projectile. The launcher X or shooter is on one side of the building 1702 and the target 1720A is on the opposite side. The target 1720A may be struck by the projectile even though the launcher X is on the opposite side of the building 1702. As a frame of reference, the opposing sides are essentially parallel. The front of the building in this scenario is essentially perpendicular to both of the opposing sides. By way of non-limiting example, the projectile may follow the first trajectory path curve 1704 and make a turn of 90° at point T in front of the building 1702 unobstructed and continue flight according to a second trajectory path curve 1706 to the target 1720A. The arrow denoted by 1710A represents the time-to-distance for the turn to commence at point T. The second trajectory path curve 1706 and the point of impact of the target 1720A may be synchronized with the time of arrival of the target 1720A in front of the building 1702. By way of non-limiting example, the target 1720A may be stationary. In this scenario, the launcher X or shooter may be on foot on the ground, in a vehicle or at some other locations on the side of building 1702. The turn maneuver profile may allow the projectile to turn a corner (90° angle) around a building and continue its flight to hit a target.

Figure 17B:
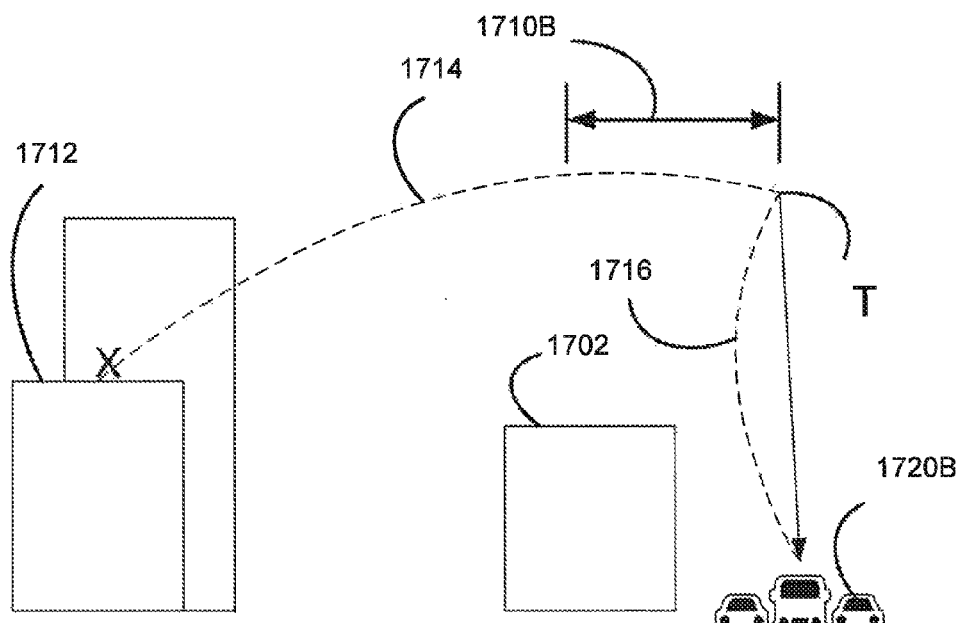
FIG. 17B illustrates a non-limiting representation of another scenario for use of the projectile.

FIG. 17B illustrates a non-limiting representation of another scenario for use of the projectile. The scenario includes a plurality of buildings 1702 and 1712 denoted as rectangular blocks. A target 1720B is obscured from the launcher X or shooter on roof of building 1712 by adjacent building 1702. In the scenario, the target 1720B is not between the buildings, but at a location on an opposing side of building 1702 opposite the side of the building 1702 directly facing adjacent building 1712. In the example, the buildings 1702 and 1712 are essentially parallel. By way of non-limiting example, the projectile may follow the first trajectory path curve 1714 and make a downward turn of 90° at point T at a point above building 1702 and continue flight according to a second trajectory path curve 1716 to the target 1720B. The arrow denoted by 1710B represents the time-to-distance for the turn to commence at point T. The second trajectory path curve 1716 and the point of impact of the target 1720B may be synchronized with the time of arrival of the target 1720B for the point of impact. By way of non-limiting example, the target 1720B may be stationary.

As can be appreciated, there are numerous possible flight paths such that it is prohibitive to describe each and every one. While the examples provided use a 90° turn, the turn may be more than 90° or less than 90°. By way of non-limiting example, the launcher X or shooter may be on a mountain, in a tree, or in a vehicle instead of on a roof top or on the ground.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

The invention claimed is:

1. A projectile system comprising:
a gun-fired projectile having a body including an aft section and a forward section, at least one tail fin coupled to the body at the aft section, a motor configured to fire during a first flight phase and fire during a second flight phase and at least one controllable canard located on the body; and
one or more processors configured to determine a turn maneuver profile to a target during the first flight phase, produce control signals to destabilize the body, create a pitch attitude change for the turn maneuver profile and effectuate a turn of the projectile in a direction corresponding to the turn maneuver profile during a turn phase of the first flight phase, and to control the motor to start the second flight phase to the target after the turn.

2. The projectile system of claim 1, wherein the turn maneuver profile includes a turn angle to effectuate the turn, the turn angle is one of: in a range up to 90°, 90°; and in a range greater than 90°.

3. The projectile system of claim 1, wherein the turn maneuver profile includes a turn angle of approximately 90°.

4. The projectile system of claim 1, the one or more processors dynamically determine a turn maneuver profile in response to a turn command received by the projectile in flight.

5. The projectile system of claim 1, wherein the projectile is a 40 mm grenade.

6. The projectile system of claim 1, further comprising:
a camera to detect a laser illuminated targets; and
a seeker for tracking a target during the first flight phase, the second flight phase or a combination of the first flight phase and the second flight phase.

7. The projectile system of claim 1, further comprising:
an onboard inertial sensor configured to sense three-axis linear accelerations and three-axis angular rates wherein the at least one controllable canard is controlled to reduce stability of the projectile to a neutral, or slightly unstable during the turn phase; and
an onboard autopilot configured to maintain control of the projectile during the turn phase.

8. The method comprising:
providing a gun-fired projectile having a body including an aft section and a forward section, at least one tail fin coupled to the body at the aft section, a motor configured to fire during a first flight phase and fire during a second flight phase and at least one controllable canard located on the body;
determining, by one or more processors, a turn maneuver profile to a target during the first flight phase;
producing, by the one or more processors, control signals to destabilize the body, create a pitch attitude change for the turn maneuver profile and effectuate a turn of the projectile in a direction corresponding to the turn maneuver profile during a turn phase of the first flight phase; and
controlling, by one or more processors, the motor to start the second flight phase to the target after the turn.

9. The method of claim 8, wherein the turn maneuver profile includes a turn angle to effectuate the turn, the turn angle is one of: in a range up to 90°, 90°; and in a range greater than 90°.

10. The method of claim 8, wherein the turn maneuver profile includes a turn angle, the turn angle is approximately 90°.

11. The method of claim 8, wherein the determining of the turn maneuver profile includes:
determining a lead time-to-distance for the turn;
determining a direction of the turn;
determining an angle of the turn; and
determining a side displacement of the body.

12. The method of claim 8, wherein the projectile is a 40 mm grenade.

13. The method of claim 8, further comprising:
detecting a laser illuminated target by the projectile; and
adjusting a flight path based on a location of the detected laser illuminated target.

14. The method of claim 8, further comprising:
tracking, by a seeker, the target during the first flight phase, the second flight phase or a combination of the first flight phase and the second flight phase.

15. The method of claim 8, further comprising:
sensing, by an onboard inertial sensor, three-axis linear accelerations and three-axis angular rates;
controlling the at least one controllable canard to reduce stability of the projectile to a neutral, or slightly unstable during the turn phase; and
maintaining, by an onboard autopilot, control of the projectile during the turn phase.

16. A computer program product for controlling flight of a projectile to make a course change by approximately 90°, greater than 90° or up to 90°, the computer program product comprising a non-transitory computer-readable medium having instructions embodied thereon, which when executed by a computer cause the computer to implement a method, the method steps comprising:
determining a turn maneuver profile to a target during a first flight phase;
producing control signals to destabilize the projectile, to create a pitch attitude change for the turn maneuver profile and effectuate a turn of the projectile in a direction corresponding to the turn maneuver profile during a turn phase of the first flight phase; and
controlling the motor to start the second flight phase to the target after the turn.

17. The computer program product of claim 16, the instruction for determining of the turn maneuver profile includes instructions which when executed by a computer cause the computer to further implement the method steps of:
determining a lead time-to-distance for the turn;
determining a direction of the turn;
determining an angle of the turn; and
determining a side displacement of the body.

18. The computer program product of claim 17, wherein the angle of the turn is approximately 90°.

19. The computer program product of claim 16, wherein the projectile is a gun-fired 40 mm projectile.

20. The computer program product of claim 16, further comprising instruction which when executed by a computer cause the computer to further implement the method step of:
automatically self-arming the projectile as a function of acceleration.

* * * * *